(12) United States Patent
Taira et al.

(10) Patent No.: US 11,782,449 B2
(45) Date of Patent: Oct. 10, 2023

(54) AUTONOMOUS MOBILE SYSTEM, AUTONOMOUS MOBILE METHOD, AND STORAGE MEDIUM

(71) Applicant: TOYOTA JIDOSHA KABUSHIKI KAISHA, Toyota (JP)

(72) Inventors: Tetsuya Taira, Nagakute (JP); Shiro Oda, Anjo (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 17/514,676

(22) Filed: Oct. 29, 2021

(65) Prior Publication Data
US 2022/0206503 A1 Jun. 30, 2022

(30) Foreign Application Priority Data
Dec. 24, 2020 (JP) ................................. 2020-215227

(51) Int. Cl.
*G05D 1/02* (2020.01)
(52) U.S. Cl.
CPC ......... *G05D 1/0214* (2013.01); *G05D 1/0246* (2013.01)

(58) Field of Classification Search
CPC ........................... G05D 1/0214; G05D 1/0246
See application file for complete search history.

(56) References Cited

U.S. PATENT DOCUMENTS

| 6,308,114 B1 * | 10/2001 | Kim ......................... G01S 5/22 446/175 |
| 2012/0185094 A1 * | 7/2012 | Rosenstein .......... G05D 1/0272 901/1 |
| 2016/0229058 A1 * | 8/2016 | Pinter ..................... G16H 40/67 |
| 2017/0176999 A1 * | 6/2017 | Bobda ................. G05D 1/0297 |
| 2019/0019416 A1 * | 1/2019 | Perko .................... G05D 1/0088 |
| 2020/0269436 A1 * | 8/2020 | Sasagawa ............... G06F 3/013 |
| 2020/0298847 A1 * | 9/2020 | Tawari ............. B60W 30/0953 |
| 2021/0049382 A1 * | 2/2021 | Naser ........................ G06T 7/11 |
| 2021/0132615 A1 * | 5/2021 | Passot .................. G05D 1/0274 |
| 2022/0009099 A1 * | 1/2022 | Kim ....................... G05D 1/024 |

FOREIGN PATENT DOCUMENTS

JP 4245887 B2 4/2009

* cited by examiner

*Primary Examiner* — Hunter B Lonsberry
*Assistant Examiner* — Harrison Heflin
(74) *Attorney, Agent, or Firm* — Dinsmore & Shohl LLP

(57) ABSTRACT

An autonomous mobile system according to the present embodiment is an autonomous mobile system that autonomously moves in a facility provided with a corner between aisles. When the autonomous mobile system turns at the corner, the autonomous mobile system calculates a magnitude of a corner radius of turning in a traveling path based on an obstacle captured in image data of a camera that captures an image of an exit of the corner.

16 Claims, 10 Drawing Sheets

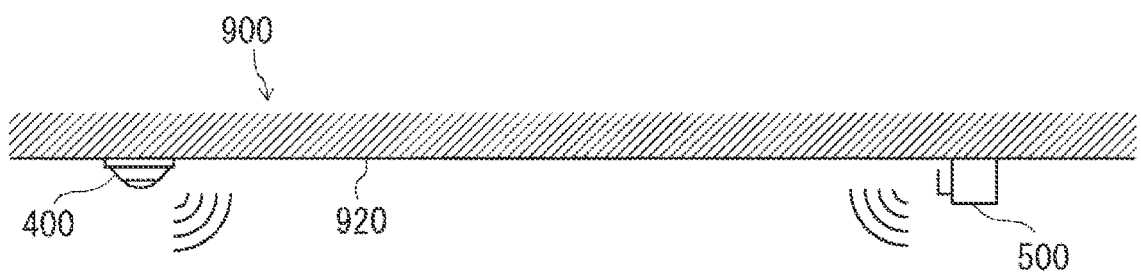
FIG. 1
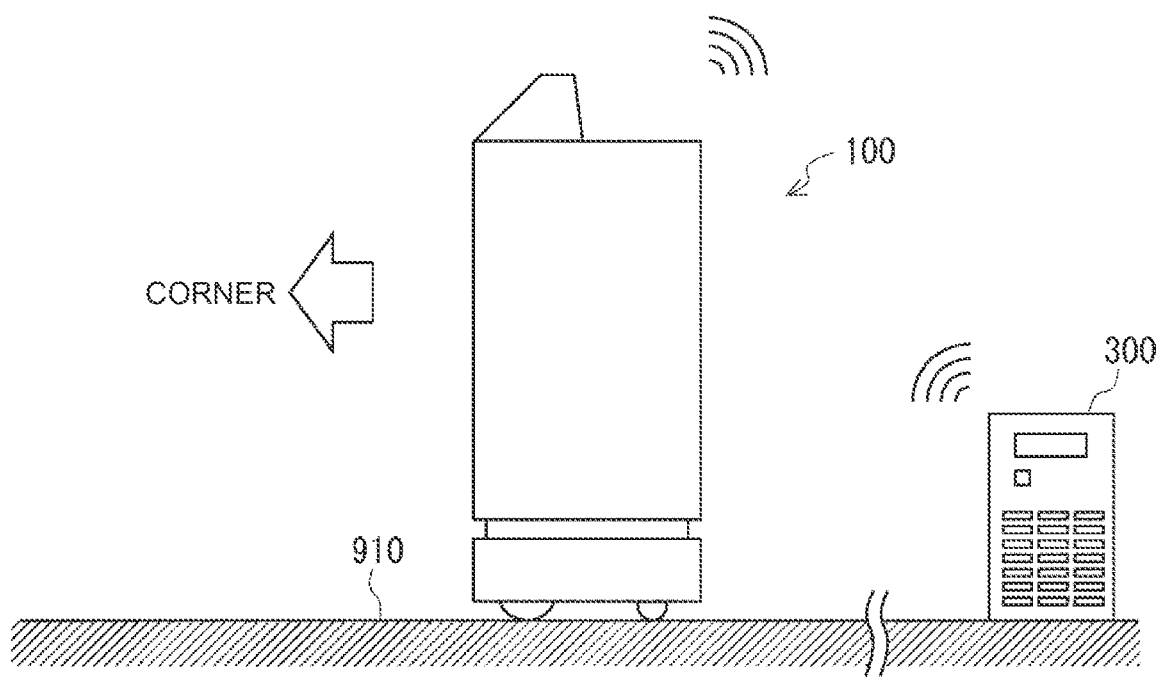

AUTONOMOUS MOBILE SYSTEM, AUTONOMOUS MOBILE METHOD, AND STORAGE MEDIUM

CROSS-REFERENCE TO RELATED APPLICATION

This application claims priority to Japanese Patent Application No. 2020-215227 filed on Dec. 24, 2020, incorporated herein by reference in its entirety.

BACKGROUND

1. Technical Field

The present disclosure relates to an autonomous mobile system, an autonomous mobile method and a storage medium.

2. Description of Related Art

Japanese Patent No. 4245887 (JP 4245887 B) describes that a transportation robot travels by turning at a corner.

SUMMARY

The transportation robot basically travels along the shortest route. However, when the transportation robot makes a turn at a corner with radius so as to travel along the shortest route, the transportation robot may possibly collide with a person or another transportation robot. There is a demand for realizing an autonomous mobile system that can travel in places such as corners while achieving both efficiency and safety.

The present disclosure has been made to solve such an issue, and provides an autonomous mobile system, an autonomous mobile method, and a storage medium capable of traveling while achieving both efficiency and safety.

An autonomous mobile system according to the present embodiment is an autonomous mobile system that autonomously moves in a facility provided with a corner between aisles, and when the autonomous mobile system turns at the corner, the autonomous mobile system calculates a magnitude of a corner radius of turning in a traveling path based on an obstacle captured in image data of a camera that captures an image of an exit of the corner, and turns at the corner with the calculated corner radius. With this configuration, the autonomous mobile system can travel while achieving both efficiency and safety.

In the above autonomous mobile system, the autonomous mobile system may calculate the magnitude of the corner radius in accordance with a ratio of the obstacle occupying a space in the image data. With this configuration, both the efficiency and safety can be achieved depending on the degree of congestion.

In the above autonomous mobile system, the autonomous mobile system may calculate the magnitude of the corner radius in accordance with a type of the obstacle in the image data. With this configuration, both the efficiency and safety can be achieved in accordance with the priority, size, and the like of the obstacle.

In the above autonomous mobile system, the corner may be configured by a first aisle extending in one direction and a second aisle extending in another direction intersecting the one direction, and the autonomous mobile system may calculate the corner radius that provides the traveling path along outer edges of the first aisle and the second aisle on an outer side at the corner, depending on a type of the obstacle in the image data. With this configuration, the autonomous mobile system can pass an obstacle having a large width.

In the above autonomous mobile system, the corner may be configured by a first aisle extending in one direction and a second aisle extending in another direction intersecting the one direction, and when the autonomous mobile system is not able to acquire the image data, the autonomous mobile system may calculate the corner radius that provides the traveling path along outer edges of the first aisle and the second aisle on an outer side at the corner, and travels in the traveling path along the outer edges. With this configuration, both the efficiency and safety can be achieved even when the image data cannot be acquired.

In the above autonomous mobile system, the autonomous mobile system may stand by near a connection point between the outer edge of the first aisle on the outer side and the outer edge of the second aisle on the outer side. With this configuration, when the autonomous mobile system passes an obstacle having a large width, the safety of the other party who passes the autonomous mobile system can be improved.

In the above autonomous mobile system, the autonomous mobile system may calculate a moving speed based on the obstacle captured in the image data, and turn at the corner at the calculated moving speed. With this configuration, the traveling efficiency can be improved.

An autonomous mobile system according to the present embodiment includes: an autonomous mobile device that autonomously moves in a facility provided with a corner in an aisle; a facility camera that is fixed in the facility and captures an image of an exit of the corner to generate image data; and a server device that transmits and receives traveling information to and from the autonomous mobile device and acquires the image data from the facility camera. When the autonomous mobile device turns at the corner, the server device calculates a magnitude of a corner radius of turning in a traveling path of the autonomous mobile device based on an obstacle captured in image data of the camera that captures the image of the exit of the corner, and the autonomous mobile device turns at the corner with the calculated corner radius. With this configuration, the autonomous mobile system can travel while achieving both the efficiency and safety.

In the above autonomous mobile system, the server device may calculate the magnitude of the corner radius in accordance with a ratio of the obstacle occupying a space in the image data. With this configuration, both the efficiency and safety can be achieved depending on the degree of congestion.

In the above autonomous mobile system, the server device may calculate the magnitude of the corner radius in accordance with a type of the obstacle in the image data. With this configuration, both the efficiency and safety can be achieved in accordance with the priority, size, and the like of the obstacle.

In the above autonomous mobile system, the corner may be configured by a first aisle extending in one direction and a second aisle extending in another direction intersecting the one direction, and the server device may calculate the corner radius that provides the traveling path along outer edges of the first aisle and the second aisle on an outer side at the corner, depending on a type of the obstacle in the image data. With this configuration, the autonomous mobile system can pass an obstacle having a large width.

In the above autonomous mobile system, the corner may be configured by a first aisle extending in one direction and a second aisle extending in another direction intersecting the one direction, when the server device is not able to acquire the image data, the server device may calculate the corner radius that provides the traveling path along outer edges of the first aisle and the second aisle on an outer side at the corner, and the server device may cause the autonomous mobile device to travel in the traveling path along the outer edges. With this configuration, both the efficiency and safety can be achieved even when the image data cannot be acquired.

In the above autonomous mobile system, the autonomous mobile device may stand by near a connection point between the outer edge of the first aisle on the outer side and the outer edge of the second aisle on the outer side. With this configuration, when the autonomous mobile device passes an obstacle having a large width, the safety of the other party who passes the autonomous mobile system can be improved.

In the above autonomous mobile system, the server device may calculate a moving speed of the autonomous mobile device based on the obstacle captured in the image data, and the autonomous mobile device may turn at the corner at the calculated moving speed. With this configuration, the traveling efficiency can be improved.

An autonomous mobile method according to the present embodiment is an autonomous mobile method for an autonomous mobile device that autonomously moves in a facility provided with a corner in an aisle, and includes: a step of calculating, when the autonomous mobile device turns at the corner, a magnitude of a corner radius of turning in a traveling path of the autonomous mobile device based on an obstacle captured in image data of a camera that captures an image of an exit of the corner; and a step of causing the autonomous mobile device to turn at the corner with the calculated corner radius. With this configuration, the autonomous mobile device can travel while achieving both the efficiency and safety.

A storage medium according to the present embodiment is a storage medium that stores an autonomous mobile program for an autonomous mobile device that autonomously moves in a facility provided with a corner in an aisle, and causes a computer to: calculate, when the autonomous mobile device turns at the corner, a magnitude of a corner radius of turning in a traveling path of the autonomous mobile device based on an obstacle captured in image data of a camera that captures an image of an exit of the corner; and cause the autonomous mobile device to turn at the corner with the calculated corner radius. With this configuration, the autonomous mobile device can travel while achieving both the efficiency and safety.

The present embodiment can provide an autonomous mobile system, an autonomous mobile method, and a storage medium capable of traveling while achieving both the efficiency and safety.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic view illustrating a mobile robot according to a first embodiment;

DETAILED DESCRIPTION OF EMBODIMENTS

Figure 2:
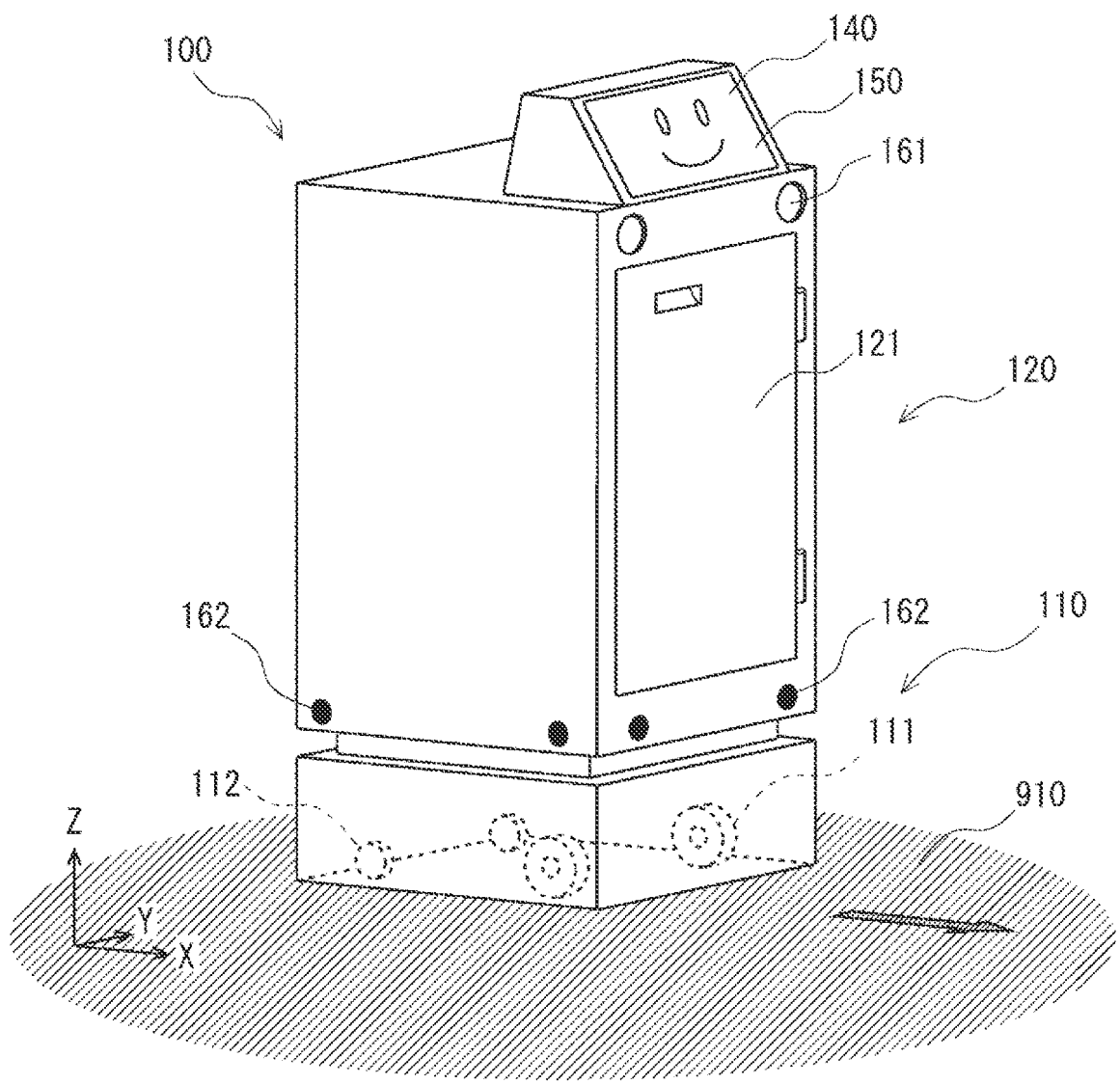
FIG. 2 is a perspective view illustrating the mobile robot according to the first embodiment.

Hereinafter, the present disclosure will be described through embodiments of the disclosure, but the disclosures in the claims are not limited to the following embodiments. Moreover, not all of the configurations described in the embodiments are indispensable as for solving the problem. For the sake of clarity, the following description and drawings have been omitted and simplified as appropriate. In each drawing, the same elements are designated by the same reference signs, and duplicate descriptions are omitted as necessary.

First Embodiment

An autonomous mobile system according to a first embodiment will be described. In the present embodiment, the autonomous mobile system may be replaced with an autonomous mobile device, or the autonomous mobile device may be replaced with an autonomous mobile system. Further, the autonomous mobile system according to the present embodiment may include the autonomous mobile device. The autonomous mobile device autonomously moves in a predetermined facility. The autonomous mobile device may be, for example, a mobile robot that autonomously moves, or a transportation robot that autonomously moves to transport an object. Hereinafter, the mobile robot will be described as an example of the autonomous mobile device. The mobile robot will be described separately in "Structure of Mobile Robot" and "Operation of Mobile Robot".

Structure of Mobile Robot

FIG. 1 is a schematic view illustrating a mobile robot according to the first embodiment. As shown in FIG. 1, a mobile robot 100 is an example of the autonomous mobile device that autonomously moves in a predetermined facility 900. The predetermined facility 900 is, for example, a hospital. The predetermined facility 900 is not limited to a hospital, and may be a hotel, a shopping mall, or the like as long as the mobile robot 100 can move autonomously in the predetermined facility 900.

The mobile robot 100 autonomously moves on a floor surface 910 in the facility 900. A facility camera 400 is fixed in the facility 900. For example, the facility camera 400 is fixed to a ceiling 920 of the facility 900, and captures images of surrounding areas of the facility camera 400 to generate image data. The facility camera 400 captures images of, for example, an aisle, a corner, a passerby, another mobile robot 100, and the like. A plurality of the facility cameras 400 may be provided in the facility 900.

The mobile robot 100 and the facility camera 400 are connected to each other so as to be able to communicate with each other via information transmission techniques such as wireless communication. The mobile robot 100 and the facility camera 400 may be connected to each other so as to be able to directly communicate with each other, or may be connected to each other so as to be able to communicate with each other via an access point 500 and a server device 300. Therefore, the mobile robot 100 may acquire the image data directly from the facility camera 400, or may acquire the image data via the access point 500 and the server device 300.

The access point 500 is, for example, a wireless local area network (LAN) access point. The access point 500 is fixed in the facility 900 and acquires position information, traveling information, and the like from the mobile robot 100 located in the periphery of the access point 500. A plurality of the access points 500 may be provided in the facility 900.

A plurality of the mobile robots 100 may autonomously move in the facility 900. When the mobile robots 100 autonomously move, the mobile robots 100 may be connected to each other so as to be able to communicate with each other via information transmission techniques such as wireless communication. The mobile robots 100 may be connected to each other so as to be able to directly communicate with each other, or may be connected to each other so as to be able to communicate with each other via the access point 500 and the server device 300.

Figure 3:
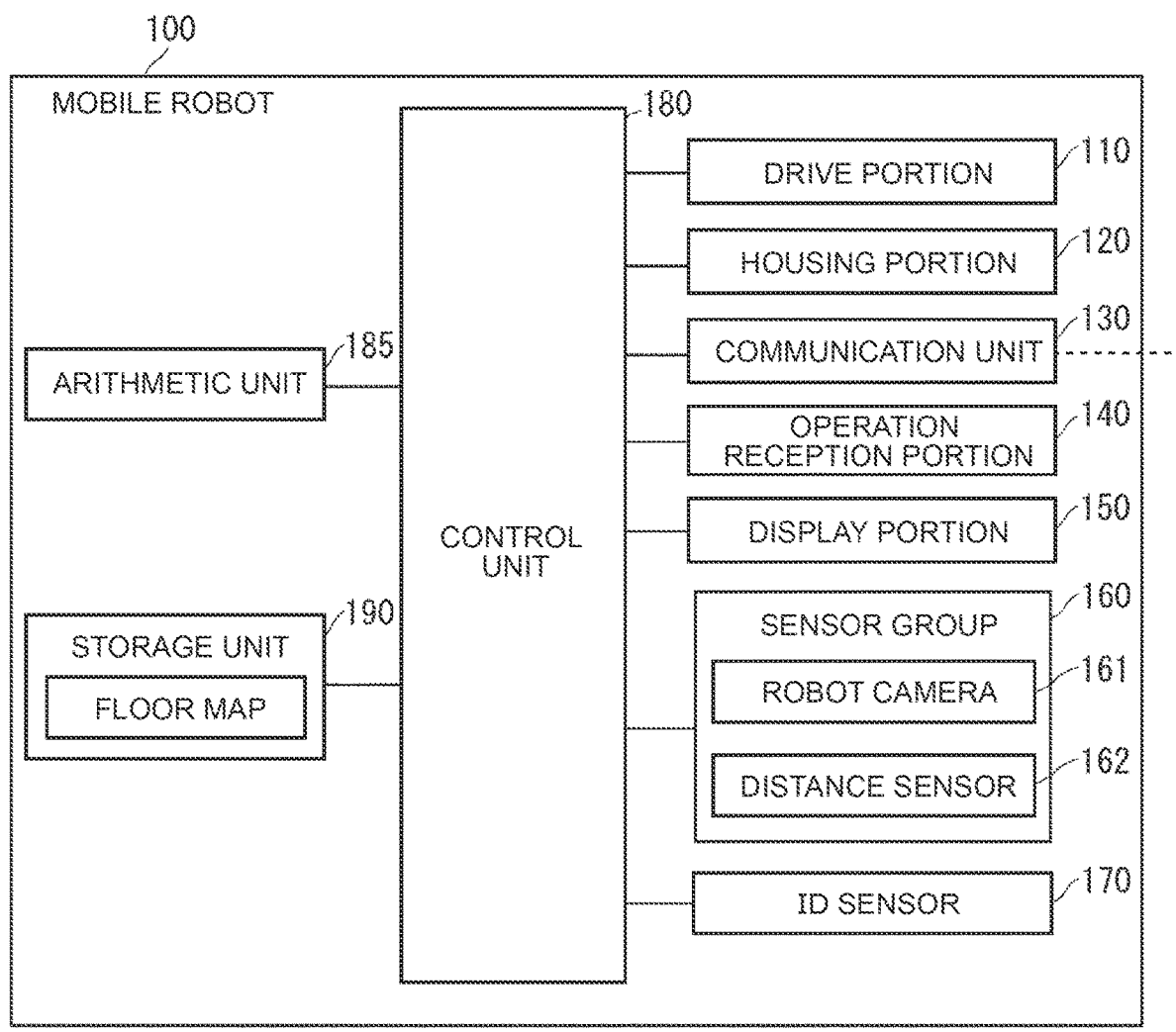
FIG. 3 is a block diagram illustrating the mobile robot according to the first embodiment.

FIG. 2 is a perspective view illustrating the mobile robot 100 according to the first embodiment. FIG. 3 is a block diagram illustrating the mobile robot 100 according to the first embodiment. As shown in FIGS. 2 and 3, the mobile robot 100 includes a drive portion 110, a housing portion 120, a communication unit 130, an operation reception portion 140, a display portion 150, a sensor group 160, an identification (ID) sensor 170, a control unit 180, an arithmetic unit 185, and a storage unit 190.

As shown in FIG. 2, the mobile robot 100 is a mobile body that moves on the floor surface 910 that is a moving surface. Here, for convenience of explanation of the mobile robot 100, the XYZ orthogonal coordinate axis system is used. The floor surface 910 is the XY-plane, and the upper side is the +Z axis direction.

The drive portion 110 functions as a device for moving the mobile robot 100. The drive portion 110 may include two drive wheels 111 that are in contact with the floor surface 910 and are rotatable independently from each other about one rotation axis that extends in a direction (right-left direction or Y-axis direction in the drawing) perpendicular to a straight direction (front-back direction or X-axis direction in the drawing), and casters 112 in contact with the floor surface 910. The mobile robot 100 moves forward or rearward in a manner such that the drive wheels 111 disposed on the right and left sides are driven at the same rotation speed, and makes a turn by generating a difference in the rotation speed or rotation direction between the right and left drive wheels 111. The drive portion 110 drives the drive wheels 111 in accordance with commands from the control unit 180.

The housing portion 120 is disposed above the drive portion 110 of the mobile robot 100. The housing portion 120 may have a storage chamber door 121. When the storage chamber door 121 is opened, a storage chamber for storing a predetermined object is provided inside the housing portion 120. That is, the mobile robot 100 can also be a transportation robot that transports a predetermined object.

The housing portion 120 may open and close the storage chamber door 121 in accordance with a command from the control unit 180.

As shown in FIG. 3, the communication unit 130 is an interface that is communicably connected to the outside. The communication unit 130 includes, for example, an antenna and a circuit that modulates or demodulates a signal transmitted through the antenna. The communication unit 130 receives the image data directly from the facility camera 400 or via the access point 500 and the server device 300. For example, the communication unit 130 receives image data in which the exit of the corner of the aisle is captured.

Further, the communication unit 130 may receive information related to the destination, position information, traveling information and the like from the server device 300. Further, the communication unit 130 may transmit information related to the state of the mobile robot 100, the position information, the traveling information, and the like to the server device 300. Further, the communication unit 130 may transmit and receive the position information and the image data to and from the other mobile robot 100 directly or via the access point 500 and the server device 300.

The communication unit 130 may periodically transmit a heartbeat signal to the server device 300. The heartbeat signal may include log data indicating the state of the mobile robot 100 in the chronological order. Further, the heartbeat signal may include the ID of the mobile robot 100 and the ID of a user.

The communication unit 130 connects to the control unit 180, outputs, to the control unit 180, a signal including information transmitted from the facility camera 400 and the server device 300, and transmits, to the server device 300, the signal including the information output from the control unit 180.

The operation reception portion 140 receives an input operation from the user and transmits an operation signal to the control unit 180. As a device for receiving an input operation from the user, the operation reception portion 140 may include, for example, an operation button, a touch panel superimposed on the display portion 150, or the like. The user operates the input operation device described above to turn on and off the power supply, open and close the storage chamber door 121, and the like.

The display portion 150 is provided, for example, so as to project from the upper surface of the housing portion 120. The display portion 150 is, for example, a display portion including a rectangular liquid crystal panel. The display portion 150 appropriately displays information in accordance with the command from the control unit 180. A touch panel that receives operations from the user may be superimposed on the display portion 150.

The sensor group 160 includes a sensor that acquires data necessary for the mobile robot 100 to move autonomously. The sensor group 160 includes, for example, a robot camera 161 and a distance sensor 162. The sensor group 160 may include sensors other than the robot camera 161 and the distance sensor 162.

The robot camera 161 is disposed in an upper portion of the housing portion 120 and below the display portion 150, for example. In the robot camera 161, two camera units having the same angle of view may be disposed horizontally separated from each other. With this configuration, the images captured by each camera unit are output to the control unit 180 as the image data.

The distance sensor 162 is disposed, for example, in the lower portion of the housing portion 120. The distance sensor 162 may be disposed in the lower portion of each of a surface on the +X-axis direction side, a surface on the −X-axis direction side, a surface on the +Y-axis direction side, and a surface on the −Y-axis direction side of the housing portion 120. The distance sensor 162 measures the distance between an object around the mobile robot 100 and the mobile robot 100. The control unit 180 recognizes the obstacle around the mobile robot 100 by analyzing the image data output by the robot camera 161 and the detection signals output by the distance sensor 162, and measures the distance between the mobile robot 100 and the obstacle.

The ID sensor 170 is provided, for example, near the display portion 150. The ID sensor 170 identifies the ID of the user who operates the mobile robot 100, and detects a unique identifier included in the ID card owned by each user. The ID sensor 170 includes, for example, an antenna for reading information on a wireless tag. The user brings the ID card close to the ID sensor 170 such that the mobile robot 100 is caused to recognize the ID of the user who is the operator.

The control unit 180 is an information processing device including an arithmetic device such as a central processing unit (CPU). The control unit 180 includes hardware provided in the control unit 180 and a program stored in the hardware. That is, processes executed by the control unit 180 are realized by either hardware or software.

The control unit 180 acquires various types of information from each configuration and issues a command to each configuration in accordance with the acquired information. For example, the control unit 180 detects the distance between the mobile robot 100 and the surrounding object from the image data acquired from the robot camera 161 and the information on the object around the mobile robot 100 acquired from the distance sensor 162. Then, the control unit 180 calculates a route to the destination from the detected distance, and commands the drive portion 110 to move along the route in accordance with the calculated route. When executing such a process, the control unit 180 refers to information related to a floor map stored in the storage unit 190.

The arithmetic unit 185 calculates a corner radius R based on the obstacle in the image data. For example, the arithmetic unit 185 calculates the magnitude of the corner radius R in the image data in accordance with a ratio of the obstacle occupying the space. Further, the arithmetic unit 185 calculates the magnitude of the corner radius R in accordance with a type of obstacle in the image data.

The storage unit 190 includes a non-volatile memory such as a flash memory and a solid state drive (SSD). The storage unit 190 stores the floor map of the facility used by the mobile robot 100 for autonomously moving. The storage unit 190 is connected to the control unit 180, and outputs stored information to the control unit 180 in response to a request from the control unit 180.

As shown in FIG. 2, the mobile robot 100 has the +X-axis direction side on which the robot camera 161 is installed as the front. That is, during normal movement, the traveling direction is the +X-axis direction as shown by the arrow.

Various ideas can be adopted for how to define the front of the mobile robot 100. For example, the front can be defined based on how the sensor group 160 for recognizing the surrounding environment is disposed. Specifically, the +X-axis direction side of the housing portion 120 on which the sensor having high recognition ability is disposed or many sensors are disposed can be set as the front. By defining the front as described above, the mobile robot 100 can move while recognizing the surrounding environment more accurately. The mobile robot 100 according to the present embodiment also has the +X-axis direction side on which the robot camera 161 is disposed as the front.

Alternatively, the front can be defined based on how the display portion 150 is disposed. When the display portion 150 displays the face of the character or the like, the surrounding people naturally recognize that the display portion 150 is the front of the mobile robot 100. Therefore, when the display surface side of the display portion 150 is set as the front, there is little discomfort to the surrounding people. The mobile robot 100 according to the present embodiment also has the display surface side of the display portion 150 as the front.

Further, the front may be defined based on a shape of the housing of the mobile robot 100. For example, when the projected shape of the housing portion 120 on the traveling surface is rectangular, it is better to have the short side as the front than the longitudinal side as the front, whereby people who pass each other are not obstructed during moving. That is, depending on the shape of the housing, there is a housing surface that is set as the front when the mobile robot 100 moves normally. The mobile robot 100 according to the present embodiment also has the short side of the rectangular shape as the front. With this configuration, the mobile robot 100 can safely pass a person, the other mobile robot 100, or the like in an aisle and at a corner.

Operation of Mobile Robot

Next, the operation of the mobile robot according to the present embodiment will be described. For example, the user turns on the power of the mobile robot 100. Then, the user inputs a desired task to the operation reception portion 140. When necessary, the ID sensor 170 identifies the ID of the user when the power is turned on or when the user operates the operation reception portion 140.

In order to transport the object as a desired task, the user operates the operation reception portion 140 to open the storage chamber door 121 and store the object in the storage chamber. Then, the user operates the operation reception portion 140 to close the storage chamber door 121. Next, the user inputs the destination of the object using the operation reception portion 140. The control unit 180 of the mobile robot 100 searches for a route to the destination using the floor map stored in the storage unit 190. The mobile robot 100 autonomously moves along the searched route.

Figure 4:
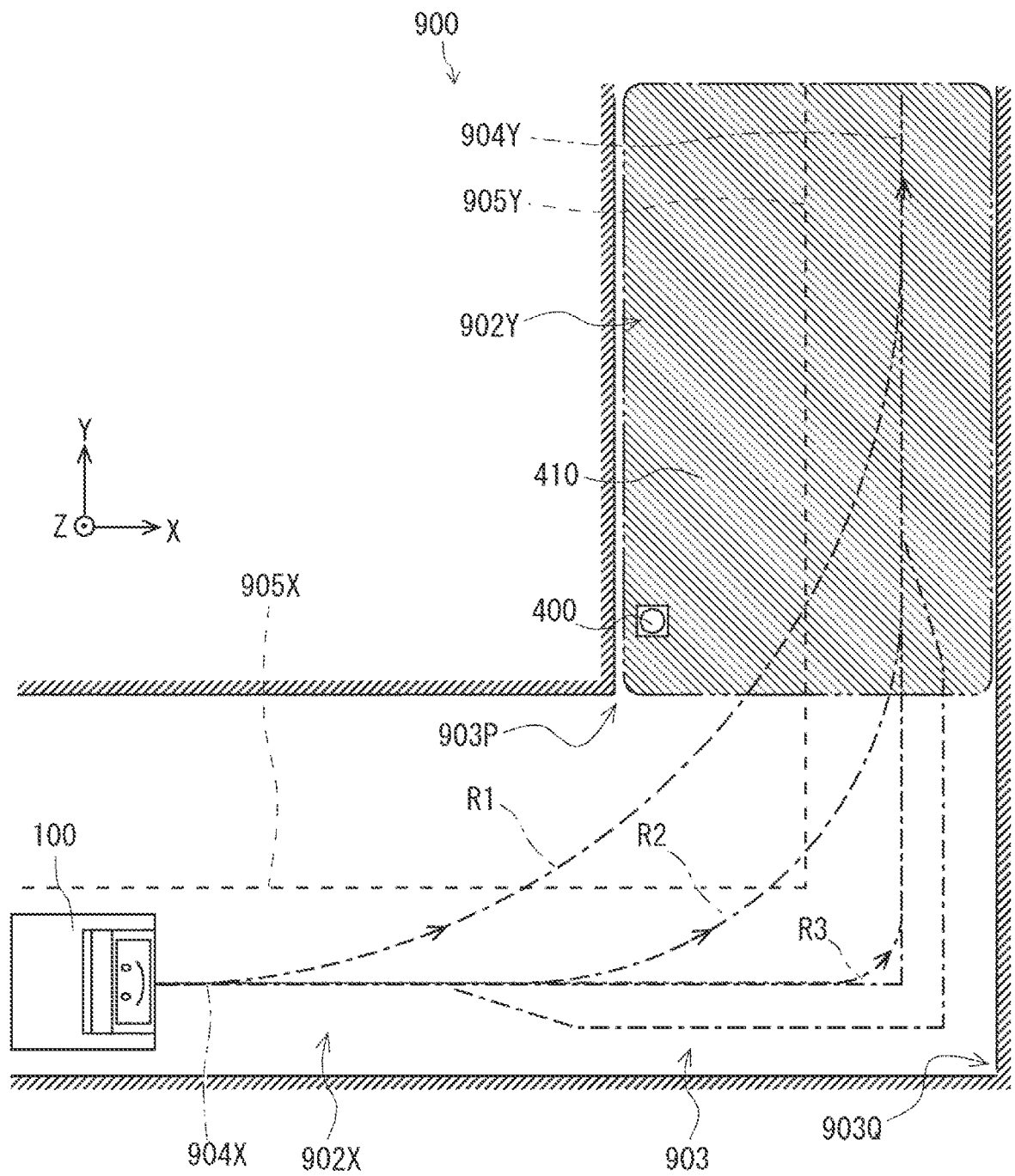
FIG. 4 is a plan view illustrating movement of the mobile robot in a facility according to the first embodiment.

FIG. 4 is a plan view illustrating movement of the mobile robot 100 in the facility 900 according to the first embodiment. As shown in FIG. 4, the facility 900 is provided with a corner 903 at which an aisle 902X extending in the X-axis direction and an aisle 902Y extending in the Y-axis direction are connected. That is, the corner 903 is configured by the aisle 902X extending in the X-axis direction and the aisle 902Y extending in the Y-axis direction. The +X-axis direction side of the aisle 902X is connected to the −Y-axis direction side of the aisle 902Y.

The mobile robot 100 autonomously moves in the facility 900 provided with the corner 903 at which the aisles 902X and 902Y are connected. Specifically, the mobile robot 100 moves in the aisle 902X from the −X-axis direction side to the +X-axis direction side. Note that, the terms movement and traveling are used interchangeably. A traveling path 904X in which the mobile robot 100 travels in the aisle 902X includes a portion extending in the X-axis direction. The mobile robot 100 turns in the Y-axis direction at the corner 903. The mobile robot 100 moves in the aisle 902Y from the −Y-axis direction side to the +Y-axis direction side. A traveling path 904Y in which the mobile robot 100 travels in the aisle 902Y includes a portion extending in the Y-axis direction. The traveling paths 904X and 904Y in which the mobile robot 100 travels are collectively referred to as a traveling path 904.

The mobile robot 100 may move in the center of the aisle 902X or may move on one side of the aisle 902X, up to the corner 903. In FIG. 4, for example, the mobile robot 100 moves on the right side of a center line 905X of the aisle 902X with respect to the traveling direction. The mobile robot 100 may move in the center of the aisle 902Y or may move on one side of the aisle 902Y after the mobile robot 100 turns at the corner 903. For example, the mobile robot 100 moves on the right side of a center line 905Y of the aisle 902Y with respect to the traveling direction.

The mobile robot 100 turns at the corner 903 at the corner radius R in the traveling path 904. That is, the mobile robot 100 turns such that a turning path in the traveling path 904 has a roundness of the corner radius R. In the drawing, a corner radius R2 is larger than a corner radius R3. The corner radius R1 is larger than the corner radius R2. As the corner radius R becomes larger, the traveling path 904 moves inward of the corner 903. For example, in the case where the mobile robot 100 traveling on the right side of the aisles 902X and 902Y turns to the left at the corner 903, when the corner radius R is large (for example, the corner radius R1 and the corner radius R2), the traveling path 904 may protrude to the left from the center lines 905X and 905Y. Then, the mobile robots starts to travel closer to the inner corner of the corner 903. In this case, the mobile robot 100 travels inward at the corner 903.

On the other hand, when the corner radius R is small, the roundness of the traveling path 904 becomes small. In this case, the traveling path 904 does not protrude to the left from the center lines 905X and 905Y (for example, the corner radius R3). When the corner radius R is 0, the mobile robot 100 turns at a right angle. That is, the mobile robot 100 turns at a right angle along the outer edges of the aisles 902X and 902Y on the outer side at the corner 903.

The facility camera 400 is fixed in the facility 900. The facility camera 400 captures an image of a range 410 around the corner 903 and generates image data. The facility camera 400 captures an image of the exit of the corner 903 when the mobile robot 100 turns at the corner 903. Note that, the robot camera 161 of the other mobile robot 100 may capture the image of the exit of the corner 903.

The mobile robot 100 receives the image data of the facility camera 400 directly from the facility camera 400 or via the server device 300 and the access point 500. Note that, the mobile robot 100 may acquire the image data of the exit captured by the robot camera 161 of the other mobile robot 100 directly from the other mobile robot 100 or via the server device 300 and the access point 500.

When the mobile robot 100 turns at the corner 903, the mobile robot 100 calculates the magnitude of the corner radius R of turning in the traveling path 904 based on the obstacle captured in the image data acquired by capturing the exit of the corner 903. Then, the mobile robot 100 turns at the corner 903 with the calculated corner radius R.

For example, the mobile robot 100 calculates the magnitude of the corner radius R in the image data in accordance with a ratio of the obstacle occupying the space. Specifically, the mobile robot 100 calculates, in the image data of the exit of the corner 903, the ratio of obstacle that hinders traveling of the mobile robot 100, such as a person, a stretcher, and the other mobile robot 100 in the space of the aisle 902Y, occupying the space. Note that, the mobile robot 100 may store the image data without obstacle that hinders traveling of the mobile robot 100 as reference data in advance and calculate the ratio of obstacle occupying the space based on a difference between the reference data and the acquired image data.

When the image data acquired by capturing the exit of the corner 903 does not capture the obstacle that hinders traveling and the ratio of the space in which the mobile robot 100 can travel is large, the corner radius R is increased. Therefore, the mobile robot 100 can travel inward at the corner 903 and shorten a traveling distance. On the other hand, when the image data includes a person running on the opposite side of the aisle 902Y in which the mobile robot 100 travels and the ratio of the space in which the mobile robot 100 can travel is small, the corner radius R is reduced. Further, a table in which the corner radius R is associated with the ratio may be stored in the storage unit 190 in advance, and the corner radius R may be calculated from the table.

Further, the mobile robot 100 may calculate the magnitude of the corner radius R in accordance with the type of obstacle in the image data. Specifically, the mobile robot 100 determines whether a predetermined mobile body is captured in the image data. The predetermined mobile body is, for example, a stretcher carrying a patient, an emergency mobile robot for transporting an urgent blood transfusion, or the like. When the predetermined mobile body is captured in the image data, the mobile robot 100 reduces the corner radius R so as not to interfere with traveling of the predetermined mobile body. Further, a table in which the corner radius R is associated with the type of obstacle may be stored in the storage unit 190 in advance, and the corner radius R may be calculated from the table.

The mobile robot 100 may calculate the corner radius R that provides the traveling path 904 along the outer edges of the aisle 902X and the aisle 902Y on the outer side at the corner 903, depending on the type of obstacle in the image data. For example, the obstacle in this case, such as a stretcher, is approximately the width of the aisle 902 when the width of the mobile robot 100 and the width of the predetermined mobile body are combined. Further, the distance to the outer edge may be changed in accordance with the type of obstacle. For example, in the case of a stretcher having a larger width than a predetermined width, the distance to the outer edge is reduced. In the case of the other mobile robot having a smaller width than the predetermined width, the distance to the outer edge is increased.

The mobile robot 100 may stand by near a connection point 903Q between the outer edge of the aisle 902X on the outer side at the corner 903 and the outer edge of the aisle 902Y on the outer side at the corner 903 when the mobile robot 100 passes the predetermined mobile body at the corner 903. At the corner 903, the distance from a connection point 903P between the inner edges of the aisles 902X and 902Y to the connection point 903Q of the outer edges is larger than the width of the aisles 902X and 902Y. Therefore, even when a mobile body having the width of about the width of the aisles 902X and 902Y turns at the corner 903, a space is generated near the connection point 903Q. With this configuration, the mobile robot 100 can safely pass the predetermined mobile body at the corner 903.

When the mobile robot 100 turns at the corner 903, a moving speed may be calculated based on the obstacle captured in the image data of the exit of the corner 903. Then, the mobile robot 100 may turn at the corner 903 at the calculated moving speed. Specifically, in the image data of the exit of the corner 903, the moving speed may be changed in accordance with the ratio of the obstacle occupying the space. When the ratio of obstacle occupying space is large, the moving speed is reduced. When the ratio of obstacle occupying space is small, the moving speed is increased. With this configuration, the time required to reach the destination can be shortened while the mobile robot 100 avoids a collision with the obstacle.

When the mobile robot 100 cannot acquire the image data acquired by capturing the exit of the corner 903, the mobile robot 100 may calculate the corner radius R that provides the traveling path 904 along the outer edges of the aisle 902X and the aisle 902Y on the outer side at the corner 903 and turn with the calculated corner radius R. With this configuration, the mobile robot 100 can safely pass the obstacle even when the mobile robot 100 passes the obstacle at the corner 903.

Figure 5:
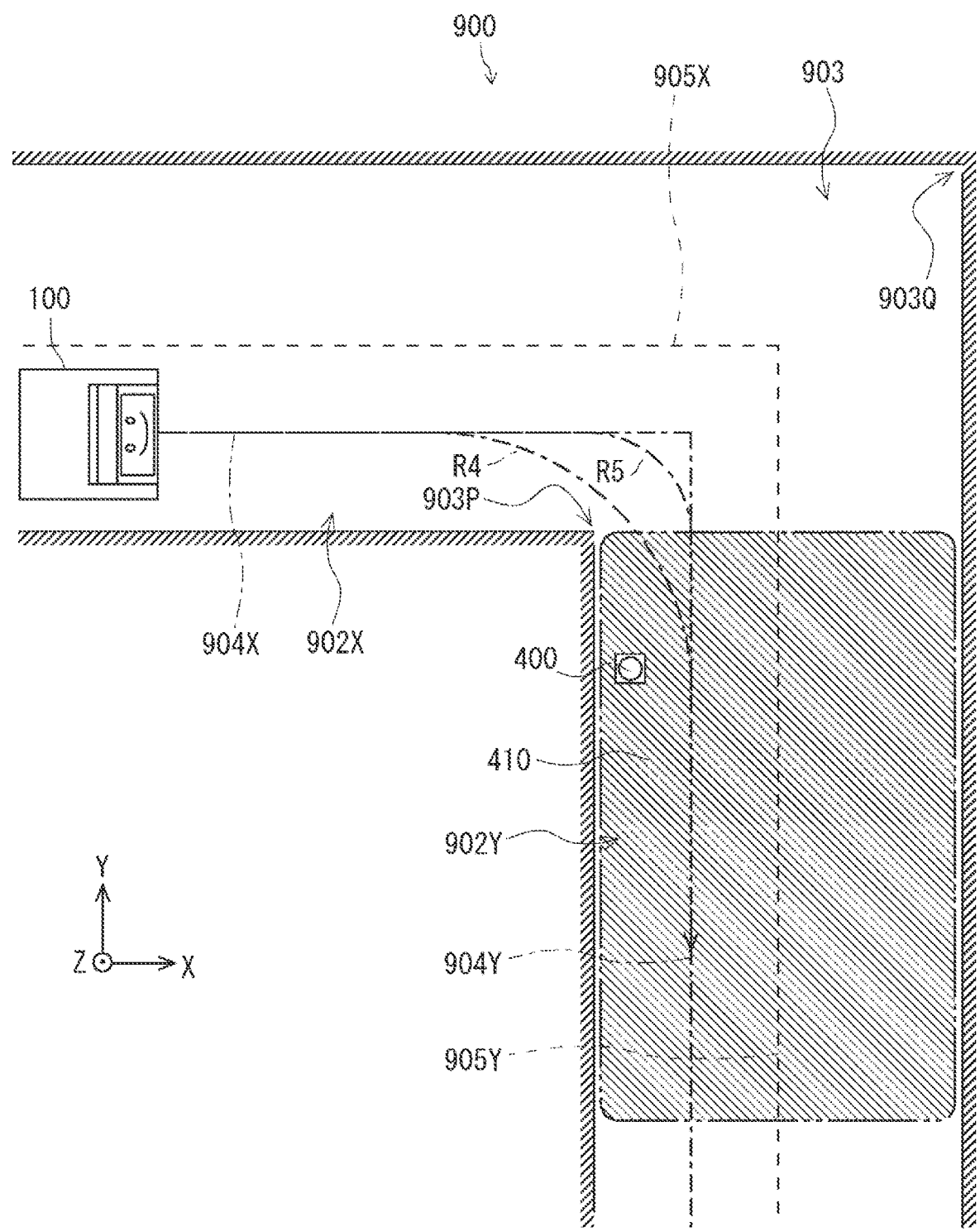
FIG. 5 is a plan view illustrating movement of the mobile robot in the facility according to the first embodiment.

FIG. 5 is a plan view illustrating movement of the mobile robot 100 in the facility 900 according to the first embodiment. As shown in FIG. 5, the +X-axis direction side of the aisle 902X is connected to the +Y-axis direction side of the aisle 902Y. Also in FIG. 5, a case where the mobile robot 100 moves on the right sides of the aisle 902X and the aisle 902Y will be described. The mobile robot 100 moves in the aisle 902X from the −X-axis direction side to the +X-axis direction side. Then, the mobile robot 100 changes its direction to the Y-axis direction at the corner 903, and moves the aisle 902Y from the +Y-axis direction side to the −Y-axis direction side.

The mobile robot 100 turns such that a turning path in the traveling path 904 has a roundness of the corner radius R. In the drawing, a corner radius R4 is larger than a corner radius R5. As the corner radius R becomes larger, the traveling path 904 moves inward of the corner 903. For example, in the case where the mobile robot 100 traveling on the right sides of the aisles 902X and 902Y turns to the right at the corner 903, when the corner radius R is large (for example, the corner radius R4), the mobile robot 100 travels close to the inner corner (the connection point 903P) at the corner 903 in the traveling path 904. In this case, the mobile robot 100 travels inward at the corner 903.

As described above, when the mobile robot 100 turns to one side or to the other side in the case where the mobile robot 100 travels on one side of the center line of the aisle 902 with respect to the traveling direction, the mobile robot 100 may change the magnitude of the corner radius R of the turning in the traveling path 904 based on the obstacle captured in the image data of the exit of the corner 903. Further, the mobile robot 100 may calculate the moving speed based on the obstacle captured in the image data of the exit of the corner 903, and turn at the corner 903 at the calculated moving speed.

Figure 6:
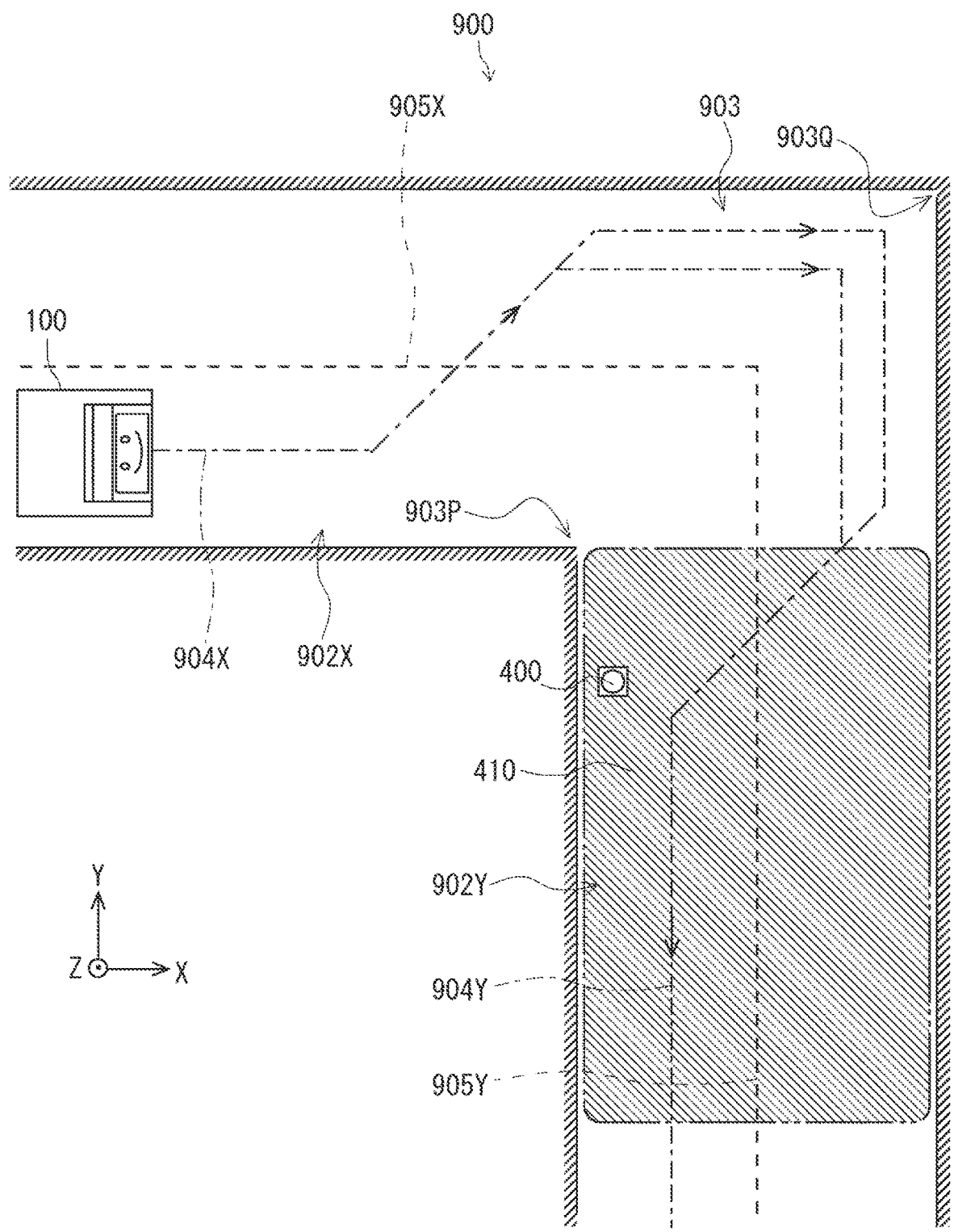
FIG. 6 is a plan view illustrating movement of the mobile robot in the facility according to the first embodiment.

FIG. 6 is a plan view illustrating movement of the mobile robot 100 in the facility 900 according to the first embodiment. As shown in FIG. 6, in the case where the predetermined mobile body is captured as the obstacle captured in the image data of the exit of the corner 903 when the mobile robot 100 traveling on the right side of the center line 905X of the aisle 902X with respect to the traveling direction turns to the right, the mobile robot 100 may calculate the corner radius R that moves the traveling path to the left and provides a traveling path along the outer edges of the aisles 902X and 902Y on the outer side at the corner 903.

Specifically, the mobile robot 100 may move to the left and travel along the outer edges of the aisles 902X and 902Y on the outer side at the corner 903. Further, the distance to the outer edge may be changed in accordance with the type of obstacle. For example, in the case of a stretcher having a larger width than a predetermined width, the distance to the outer edge is reduced. In the case of the other mobile robot 100 having a width smaller than the predetermined width, the distance to the outer edge is increased.

The mobile robot 100 may stand by near the connection point 903Q between the outer edge of the aisle 902X on the outer side and the outer edge of the aisle 902Y on the outer side. With this configuration, the mobile robot 100 can move in the shortest distance and can safely pass the predetermined mobile body at the corner 903.

As described above, the autonomous mobile method for the mobile robot 100 that autonomously moves in the facility 900 causes, when the mobile robot 100 turns at the corner 903, the mobile robot 100 to calculate the magnitude of the corner radius R of turning in the traveling path 904 based on the obstacle captured in the image data of the camera that captures the image of the exit of the corner 903 and turn at the corner 903 with the calculated corner radius R. The operation to move the mobile robot 100 at the corner 903 will be described with reference to the flowchart.

Figure 7:
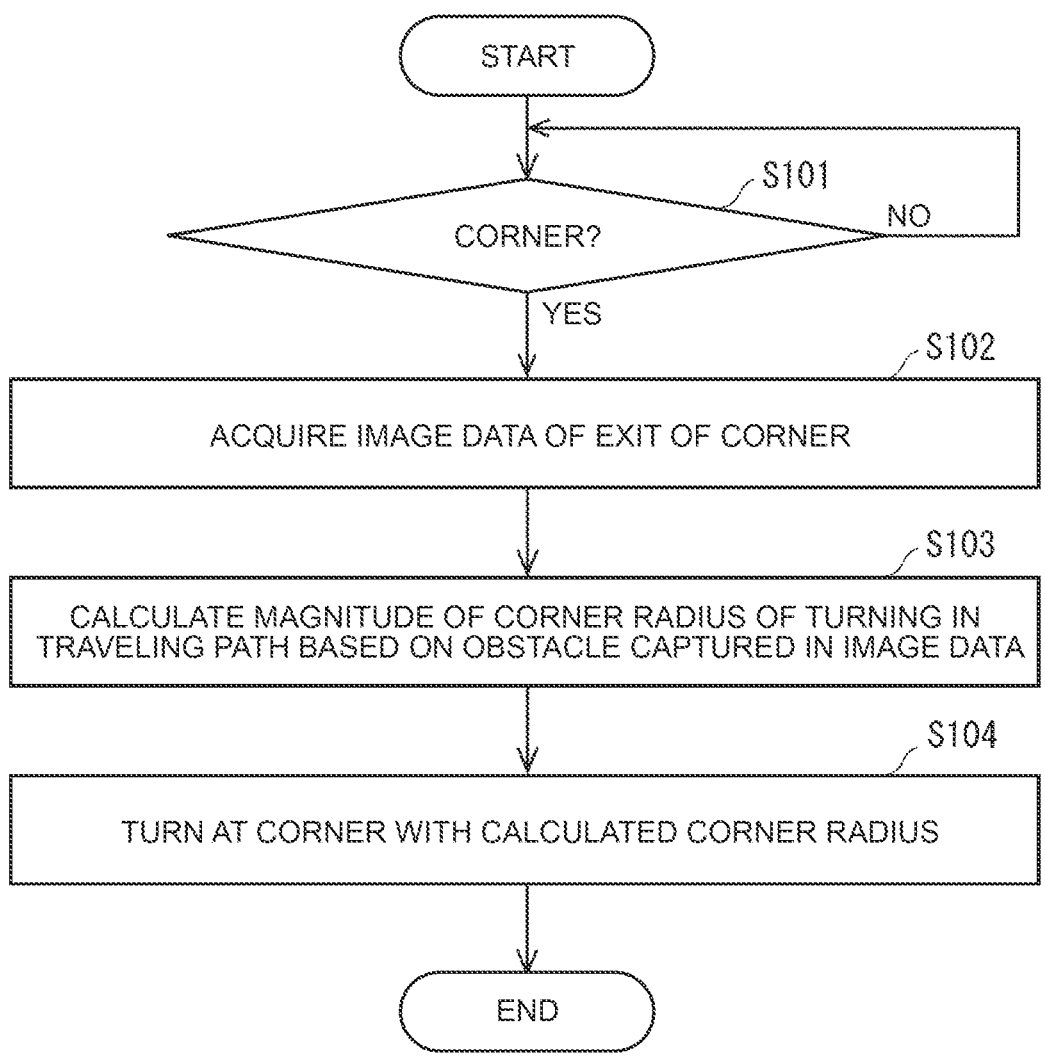
FIG. 7 is a flowchart illustrating an operation of the mobile robot at a corner according to the first embodiment.

FIG. 7 is a flowchart illustrating an operation of the mobile robot at the corner according to the first embodiment. As shown in step S101 of FIG. 7, the mobile robot 100 determines whether there is the corner 903 along the route to the destination. Specifically, the control unit 180 of the mobile robot 100 may determine whether there is the corner 903 forward in the traveling direction along the route to the destination based on the image data of the robot camera 161, or may determine whether there is the corner 903 forward in the traveling direction along the route to the destination by associating the position information with the floor map stored in the storage unit 190. Further, the mobile robot 100 may determine whether there is the corner 903 forward in the traveling direction along the route to the destination based on the position information transmitted from the server device 300. When there is no corner 903, the process in step S101 is repeated until there is a corner.

Next, in step S101, when there is the corner 903 along the route to the destination, the mobile robot 100 acquires image data of the exit of the corner 903 as shown in step S102. For example, the control unit 180 of the mobile robot 100 may acquire image data of the exit of the corner 903 captured by the facility camera 400 via the communication unit 130. Further, the mobile robot 100 may acquire image data of the exit of the corner 903 captured by the other mobile robot 100 via the communication unit 130.

Next, as shown in step S103, the control unit 180 of the mobile robot 100 causes the arithmetic unit 185 to calculate the magnitude of the corner radius R of turning in the traveling path 904 based on the obstacle captured in the image data. The method of calculating the magnitude of the corner radius R will be described later. When calculating the magnitude of the corner radius R, the mobile robot 100 may calculate the moving speed based on the obstacle captured in the image data.

Next, as shown in step S104, the control unit 180 of the mobile robot 100 causes the drive portion 110 to turn at the corner 903 with the calculated corner radius R. Note that, when the mobile robot 100 turns at the corner 903 with the calculated corner radius R, the mobile robot 100 may turn at the corner 903 at the calculated moving speed. As described above, the mobile robot 100 turns at the corner 903.

Figure 8:
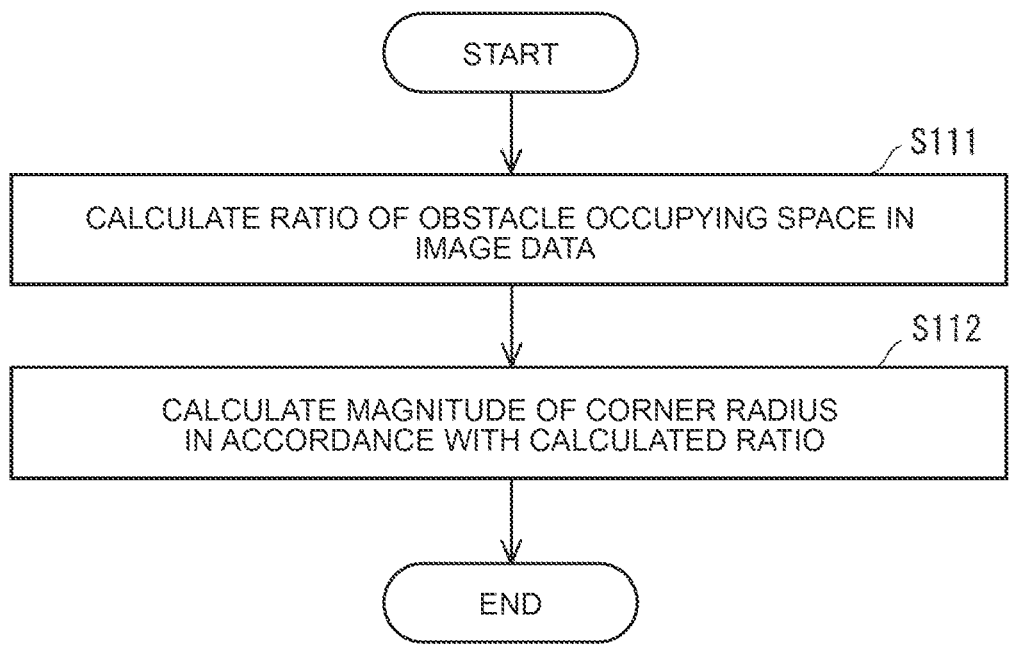
FIG. 8 is a flowchart illustrating a method of calculating a magnitude of a corner radius R in the mobile robot according to the first embodiment.

FIG. 8 is a flowchart illustrating a method of calculating the magnitude of the corner radius R in the mobile robot 100 according to the first embodiment. As shown in step S111 of FIG. 8, when the control unit 180 of the mobile robot 100 causes the arithmetic unit 185 to calculate the magnitude of the corner radius R, the control unit 180 may cause the arithmetic unit 185 to calculate the ratio of obstacle occupying the space. Next, as shown in step S112, the control unit 180 of the mobile robot 100 causes the arithmetic unit 185 to calculate the magnitude of the corner radius R in accordance with the calculated ratio. For example, a table in which the corner radius R is associated with the ratio may be stored in the storage unit 190 in advance, and the corner radius R may be calculated from the table.

Figure 9:
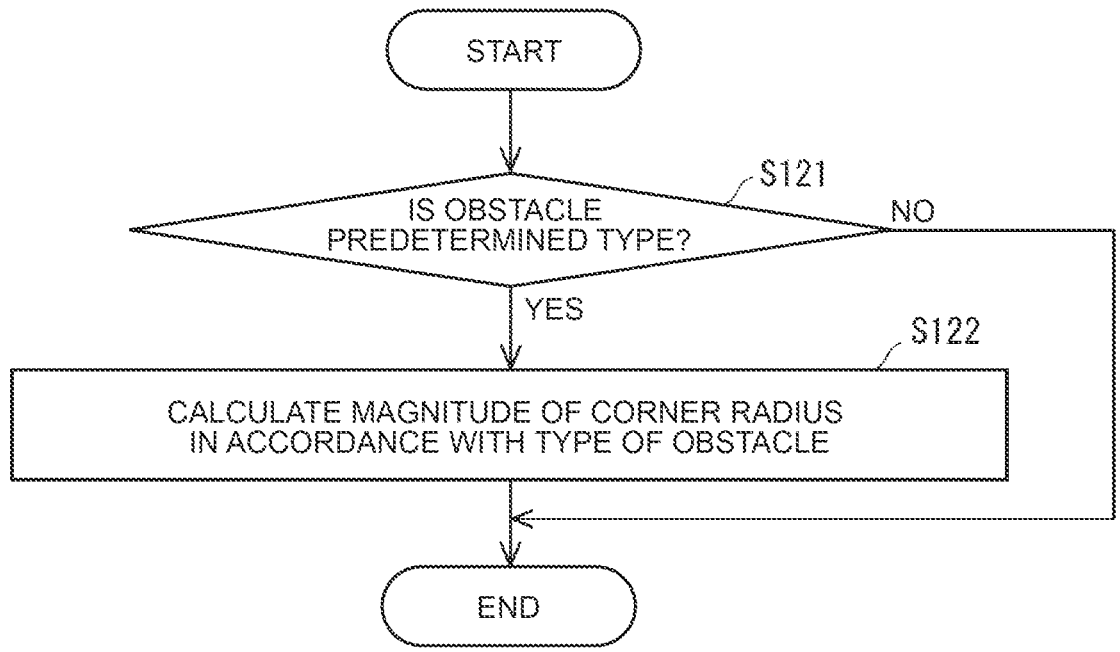
FIG. 9 is a flowchart illustrating a method of calculating the magnitude of the corner radius R in the mobile robot according to the first embodiment.

FIG. 9 is a flowchart illustrating a method of calculating the magnitude of the corner radius R in the mobile robot 100 according to the first embodiment. As shown in step S121 of FIG. 9, when the control unit 180 of the mobile robot 100 causes the arithmetic unit 185 to calculate the magnitude of the corner radius R, the control unit 180 of the mobile robot 100 determines whether the type of obstacle in the image data is a predetermined type. Then, as shown in step S122, the control unit 180 of the mobile robot 100 may cause the arithmetic unit 185 to calculate the magnitude of the corner radius R in accordance with the type of obstacle in the image data. For example, a table in which the corner radius R is associated with the type of obstacle may be stored in the storage unit 190 in advance, and the corner radius R may be calculated from the table.

Note that, in step S122, the mobile robot 100 may cause the arithmetic unit 185 to calculate the corner radius R that provides the traveling path along the outer edges of the aisle 902X and the aisle 902Y on the outer side at the corner 903, depending on the type of obstacle in the image data. That is, the mobile robot 100 may turn along the outer edges of the aisles 902X and 902Y on the outer side. Further, when the mobile robot 100 cannot acquire the image data, the mobile robot 100 may calculate the corner radius R that provides the traveling path along the outer edges of the aisle 902X and the aisle 902Y on the outer side at the corner 903 and turn at the corner 903 with the calculated corner radius R. Still further, depending on the predetermined mobile body, the mobile robot 100 may wait near the connection point 903Q.

Next, the effect of the present embodiment will be described. The mobile robot 100 according to the present embodiment changes the magnitude of the corner radius R of turning in the traveling path 904 based on the obstacle in the image data of the exit of the corner 903. Therefore, the mobile robot 100 can travel while achieving both efficiency and safety.

For example, the magnitude of the corner radius R is changed in accordance with the ratio of the obstacle occupying the space in the image data. Therefore, the time spent by the mobile robot 100 at the corner 903 can be shortened, and the mobile robot 100 can safely pass the obstacle. Therefore, both efficiency and safety can be achieved depending on the degree of congestion.

Further, the magnitude of the corner radius R is changed in accordance with the type of the obstacle. Therefore, the mobile robot 100 can safely pass the obstacle. For example, when the mobile robot 100 passes by an obstacle having a large width, the mobile robot 100 may turn along the outer edge of the aisle 902 on the outer side. Further, in some cases, the mobile robot 100 may stand by near the connection point 903Q. With this configuration, both the efficiency and safety can be achieved at the same time in accordance with the priority, size, and the like of the obstacle, and the mobile robot 100 can safely pass the obstacle.

When the image data cannot be acquired, the mobile robot 100 is caused to turn along the outer edge of the aisle 902 on the outer side. With this configuration, both the efficiency and safety can be achieved even when the image data cannot be acquired.

Second Embodiment

Next, an autonomous mobile system according to a second embodiment will be described. The autonomous mobile system according to the present embodiment is a system that controls an autonomous mobile device that autonomously moves in the predetermined facility 900. The autonomous mobile system will be described separately in "Configuration of Autonomous Mobile System" and "Operation of Autonomous Mobile System".

Configuration of Autonomous Mobile System

The autonomous mobile system includes the mobile robot 100. The autonomous mobile system may include a plurality of the mobile robots 100. Further, the autonomous mobile system may include the server device 300 and the facility camera 400 in addition to the mobile robot 100.

Mobile Robot

The configuration of the mobile robot 100 according to the present embodiment is the same as that of the above-described first embodiment. The mobile robot 100 according to the present embodiment may cause the server device 300 to execute some of the functions of the mobile robot 100 according to the first embodiment.

For example, the image data captured by the facility camera 400 may be acquired by the server device 300, and the mobile robot 100 may acquire the image data from the server device 300. Further, the image data captured by the other mobile robot 100 may be acquired by the server device 300, and the mobile robot 100 may acquire the image data from the server device 300.

The mobile robot 100 may cause the server device 300 to determine whether the destination is the corner 903. Further, the mobile robot 100 may cause the server device 300 to calculate the corner radius R. The mobile robot 100 may acquire the calculated corner radius R from the server device 300.

Server Device

The server device 300 is, for example, a computer having a communication function. The server device 300 may be installed at any place as long as the server device 300 can communicate with each configuration of an autonomous mobile device control system. The server device 300 may transmit and receive the traveling information to and from the mobile robot 100, and may acquire image data from the facility camera 400.

Figure 10:
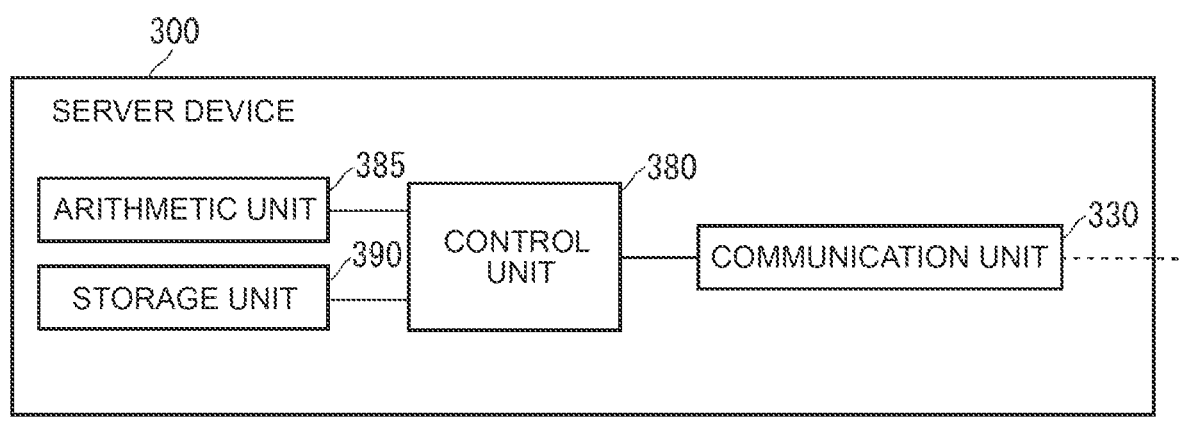
FIG. 10 is a block diagram illustrating a server device according to a second embodiment.

FIG. 10 is a block diagram illustrating a server device according to the second embodiment. As shown in FIG. 10, the server device 300 includes a communication unit 330, a control unit 380, an arithmetic unit 385, and a storage unit 390.

The communication unit 330 communicates with the mobile robot 100 and the facility camera 400 individually. The communication unit 330 outputs a signal received from each configuration to the control unit 380. Further, the communication unit 330 appropriately transmits a signal output from the control unit 380 to each configuration. The communication unit 330 may include a router device for performing communication between the server device 300 and a plurality of configurations. The communication unit 330 may have a plurality of communication units different for each component to communicate with each other in order to communicate with the server device 300 and the configurations. The communication unit 330 may be communicably connected to each configuration via an intranet line or the Internet line.

The communication unit 330 may request the facility camera 400 or the robot camera 161 for transmitting the image data of the exit of the corner 903. The communication unit 330 may receive the image data of the exit of the corner 903 from the facility camera 400 or the robot camera 161. Further, the communication unit 330 may transmit the calculated corner radius R to the mobile robot 100 when the mobile robot 100 turns at the corner 903.

The control unit 380 is configured of an arithmetic device such as a CPU and executes various types of information processing. The control unit 380 acquires the position information, the traveling information, and the like from the mobile robot 100, and causes the arithmetic unit 385 to calculate the corner radius R based on the obstacle in the image data acquired from the facility camera 400.

The arithmetic unit 385 calculates the corner radius R based on the obstacle in the image data. For example, the arithmetic unit 385 calculates the magnitude of the corner radius R in the image data in accordance with the ratio of the obstacle occupying the space. Further, the arithmetic unit 385 calculates the magnitude of the corner radius R in accordance with the type of obstacle in the image data.

The storage unit 390 includes a non-volatile memory such as a flash memory and an SSD. The storage unit 390 stores the floor map of the facility used by the mobile robot 100 for autonomously moving. The storage unit 390 is connected to the control unit 380, and outputs stored information to the control unit 380 in response to a request from the control unit 380.

Operation of Autonomous Mobile System

Figure 11:
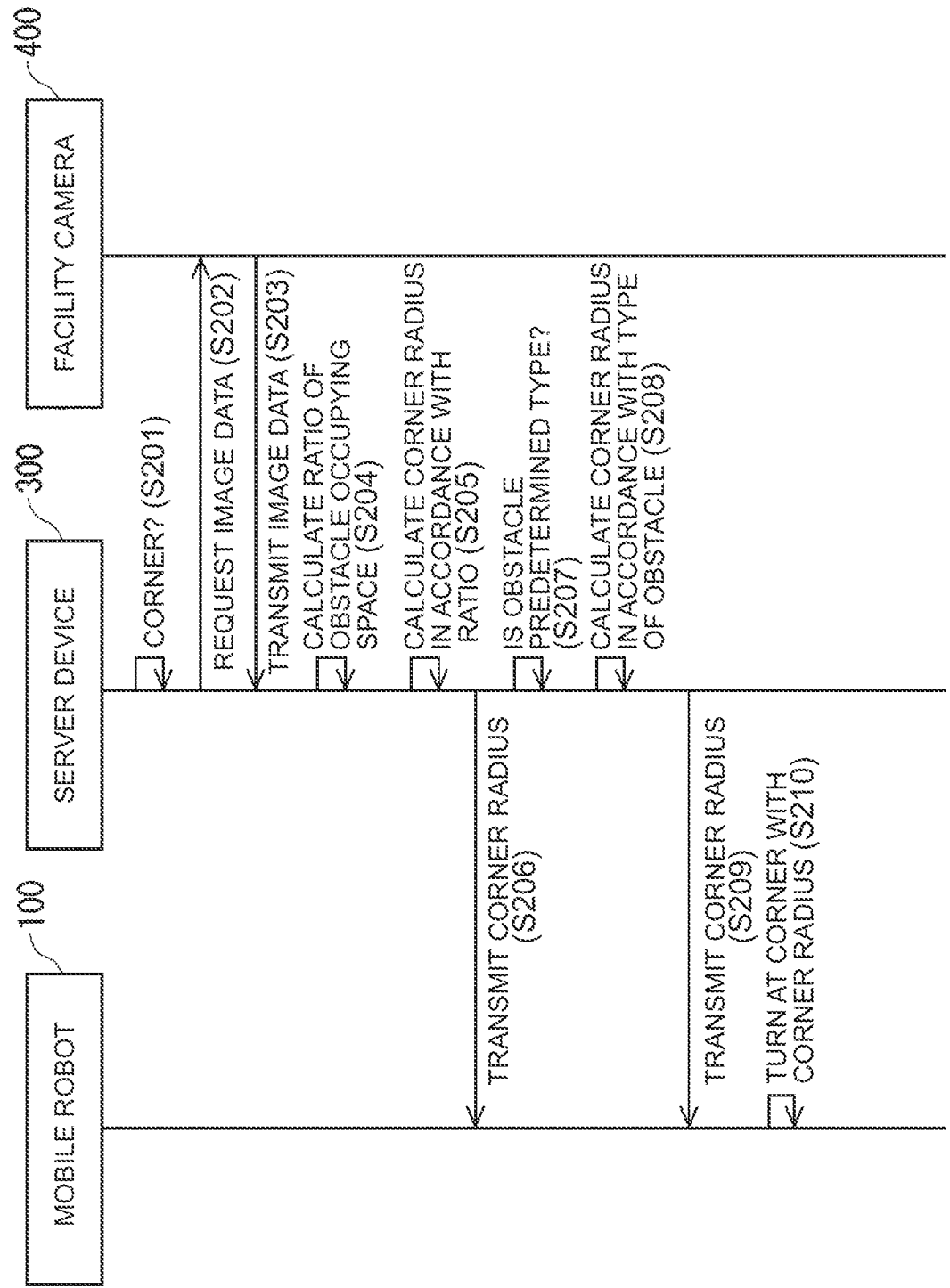
FIG. 11 is a sequence diagram illustrating the operation of an autonomous mobile device control system according to the second embodiment.

Next, the operation of the autonomous mobile system will be described. FIG. 11 is a sequence diagram illustrating the operation of the autonomous mobile system according to the second embodiment.

As shown in step S201 of FIG. 11, the server device 300 determines whether there is a corner along the route of the mobile robot 100 to the destination. The server device 300 may determine whether there is the corner 903 along the route of the mobile robot 100 to the destination based on the image data of the robot camera 161 transmitted from the mobile robot 100, or may determine whether there is the corner 903 along the route of the mobile robot 100 to the destination by associating the position information of the mobile robot 100 with the floor map stored in the storage unit 390. Note that, the server device 300 may receive, from the mobile robot 100, the result of determination by the mobile robot 100 on whether there is the corner 903 along the route to the destination. When there is no corner 903, the process in step S201 is repeated until there is a corner.

Next, when there is the corner 903 along the route to the destination in step S201, the server device 300 requests the facility camera 400 for transmitting the image data of the exit of the corner 903 as shown in step S202. In response to the request, as shown in step S203, the facility camera 400 transmits the image data of the exit of the corner 903 to the server device 300. Note that, the server device 300 may acquire the image data of the exit of the corner 903 from the other mobile robot 100.

Next, as shown in steps S204 and S205, or steps S207 and S208, the server device 300 calculates the magnitude of the corner radius R of turning in the traveling path 904 of the mobile robot 100 based on the obstacle captured in the image data.

Specifically, as shown in step S204, the server device 300 calculates the ratio of the obstacle occupying the space in the image data. Next, as shown in step S205, the server device 300 calculates the magnitude of the corner radius R in accordance with the calculated ratio. Then, as shown in step S206, the server device 300 transmits the calculated magnitude of the corner radius R to the mobile robot 100.

Further, as shown in step S207, the server device 300 may determine whether the obstacle in the image data is a predetermined type. Then, as shown in step S208, the server device 300 may calculate the magnitude of the corner radius R in accordance with the type of obstacle in the image data. Next, as shown in step S209, the server device 300 transmits the magnitude of the calculated corner radius R to the mobile robot 100.

Note that, the server device 300 may calculate the corner radius R that causes the mobile robot 100 to travel along the outer edges of the aisle 902X and the aisle 902Y on the outer side at the corner 903. Further, the server device 300 may cause the mobile robot 100 to stand by near the connection point 903Q between the outer edge of the aisle 902X on the outer side and the outer edge of the aisle 902Y on the outer side. Still further, the server device 300 may calculate the moving speed of the mobile robot 100 based on the obstacle captured in the image data.

Next, as shown in step S210, the mobile robot 100 turns at a corner with the corner radius R calculated by the server device 300. Further, the mobile robot 100 turns a corner at the moving speed calculated by the server device 300. As described above, the mobile robot 100 turns at the corner 903. Note that, when the server device 300 cannot acquire the image data, the server device 300 may calculate the corner radius R that provides the traveling path 904 along the outer edges of the aisle 902X and the aisle 902Y on the outer side at the corner 903 and cause the mobile robot 100 to travel in the traveling path along the outer edges.

According to the present embodiment, the server device 300 calculates the magnitude of the corner radius R for the mobile robot 100 based on the obstacle captured in the image data of the exit of the corner 903. Therefore, the mobile robot 100 can be efficiently and safely caused to turn at the corner 903.

In addition, the server device 300 can take on some functions of the mobile robot 100. Therefore, the load on the mobile robot 100 can be reduced, and the processing speed of the mobile robot 100 can also be improved. Other configurations, operations and effects are included in the description of the first embodiment.

The present disclosure is not limited to the above embodiments, and can be appropriately modified without departing from the spirit. For example, a combination of the configurations of the first and second embodiments is also included in the scope of the technical idea of the present embodiment. In addition, the autonomous mobile method and the autonomous mobile program shown below are also included in the scope of the technical idea of the present embodiment.

APPENDIX 1

An autonomous mobile method for an autonomous mobile device that autonomously moves in a facility provided with a corner in an aisle includes: a step of calculating, when the autonomous mobile device turns at the corner, a magnitude of a corner radius of turning in a traveling path of the autonomous mobile device based on an obstacle captured in image data of a camera that captures an image of an exit of the corner; and a step of causing the autonomous mobile device to turn at the corner with the calculated corner radius.

APPENDIX 2

In the autonomous mobile method according to Appendix 1, in the step of calculating the magnitude of the corner radius, the autonomous mobile device is caused to calculate the magnitude of the corner radius in accordance with a ratio of the obstacle occupying a space in the image data.

APPENDIX 3

In the autonomous mobile method according to Appendix 1, in the step of calculating the magnitude of the corner radius, the autonomous mobile device is caused to calculate the magnitude of the corner radius in accordance with a type of the obstacle in the image data.

APPENDIX 4

In the autonomous mobile method according to Appendix 1, the corner is configured by a first aisle extending in one direction and a second aisle extending in another direction intersecting the one direction, and in the step of calculating the magnitude of the corner radius, the autonomous mobile device is caused to calculate the corner radius that provides the traveling path along outer edges of the first aisle and the second aisle on an outer side at the corner, depending on a type of the obstacle in the image data.

APPENDIX 5

In the autonomous mobile method according to Appendix 1, the corner is configured by a first aisle extending in one direction and a second aisle extending in another direction intersecting the one direction, in the step of calculating the magnitude of the corner radius, when the image data is not able to be acquired, the autonomous mobile device is caused to calculate the corner radius that provides the traveling path along outer edges of the first aisle and the second aisle on an outer side at the corner, and in the step of causing the autonomous mobile device to turn at the corner with the calculated corner radius, the autonomous mobile device is caused to travel in the traveling path along the outer edges.

APPENDIX 6

In the autonomous mobile method according to Appendix 4 or 5, the autonomous mobile device is caused to stand by near a connection point between the outer edge of the first aisle on the outer side and the outer edge of the second aisle on the outer side.

APPENDIX 7

In the autonomous mobile method according to any one of Appendices 1 to 5, in the step of calculating the magnitude of the corner radius, the autonomous mobile device is caused to calculate a moving speed based on the obstacle captured in the image data, and in the step of causing the autonomous mobile device to turn at the corner with the calculated corner radius, the autonomous mobile device is caused to turn at the corner with the calculated corner radius.

APPENDIX 8

An autonomous mobile program for an autonomous mobile device that autonomously moves in a facility provided with a corner in an aisle causes a computer to: calculate, when the autonomous mobile device turns at the corner, a magnitude of a corner radius of turning in a traveling path of the autonomous mobile device based on an obstacle captured in image data of a camera that captures an image of an exit of the corner; and cause the autonomous mobile device to turn at the corner with the calculated corner radius.

APPENDIX 9

The autonomous mobile program according to Appendix 8 causes the computer to calculate the magnitude of the corner radius in accordance with a ratio of the obstacle occupying a space in the image data when the computer is caused to calculate the magnitude of the corner radius.

APPENDIX 10

The autonomous mobile program according to Appendix 8 causes the computer to calculate the magnitude of the corner radius in accordance with a type of the obstacle in the image data when the computer is caused to calculate the magnitude of the corner radius.

APPENDIX 11

In the autonomous mobile program according to Appendix 8, the corner may be configured by a first aisle extending in one direction and a second aisle extending in another direction intersecting the one direction, and when the computer is caused to calculate the magnitude of the corner radius, the computer is caused to calculate the corner radius that provides the traveling path along outer edges of the first aisle and the second aisle on an outer side at the corner, depending on a type of the obstacle in the image data.

APPENDIX 12

In the autonomous mobile program according to Appendix 8, the corner is configured by a first aisle extending in one direction and a second aisle extending in another direction intersecting the one direction, in the case where the image data is not able to be acquired when the computer is caused to calculate the magnitude of the corner radius, the computer is caused to calculate the corner radius that provides the traveling path along outer edges of the first aisle and the second aisle on an outer side at the corner, and when the autonomous mobile device is caused to turn at the corner with the calculated corner radius, the autonomous mobile device is caused to travel in the traveling path along the outer edges.

APPENDIX 13

The autonomous mobile program according to Appendix 11 or 12 causes the computer to cause the autonomous mobile device to stand by near a connection point between the outer edge of the first aisle on the outer side and the outer edge of the second aisle on the outer side.

APPENDIX 14

The autonomous mobile program according to any one of Appendices 8 to 12 causes the computer to calculate a moving speed based on the obstacle captured in the image data when the computer is caused to calculate the magnitude of the corner radius, and when the autonomous mobile device is caused to turn at the corner with the calculated corner radius, the autonomous mobile device is caused to turn at the corner at the calculated moving speed.

What is claimed is:

1. An autonomous mobile system that autonomously moves in a facility provided with a corner in an aisle, wherein when the autonomous mobile system turns at the corner, the autonomous mobile system calculates a magnitude of a corner radius of turning in a traveling path based on an obstacle captured in image data of a camera that captures an image of an exit of the corner, and turns at the corner with the calculated corner radius,
   wherein the corner is configured by a first aisle extending in one direction and a second aisle extending in another direction intersecting the one direction, and
   wherein, when the autonomous mobile system is not able to acquire the image data, the autonomous mobile system calculates the corner radius that provides the traveling path along outer edges of the first aisle and the second aisle on an outer side at the corner, and the autonomous mobile system travels in the traveling path along the outer edges.

2. The autonomous mobile system according to claim 1, wherein the autonomous mobile system calculates the magnitude of the corner radius in accordance with a ratio of the obstacle occupying a space in the image data.

3. The autonomous mobile system according to claim 1, wherein the autonomous mobile system calculates the magnitude of the corner radius in accordance with a type of the obstacle in the image data.

4. The autonomous mobile system according to claim 1, wherein the autonomous mobile system calculates the corner radius that provides the traveling path along the outer edges of the first aisle and the second aisle on the outer side at the corner, depending on a type of the obstacle in the image data.

5. The autonomous mobile system according to claim 4, wherein the autonomous mobile system stands by near a connection point between the outer edge of the first aisle on the outer side and the outer edge of the second aisle on the outer side.

6. The autonomous mobile system according to claim 1, wherein the autonomous mobile system stands by near a connection point between the outer edge of the first aisle on the outer side and the outer edge of the second aisle on the outer side.

7. The autonomous mobile system according to claim 1, wherein the autonomous mobile system calculates a moving speed based on the obstacle captured in the image data, and turns at the corner at the calculated moving speed.

8. An autonomous mobile system, comprising:
   an autonomous mobile device that autonomously moves in a facility provided with a corner in an aisle;
   a facility camera that is fixed in the facility and captures an image of an exit of the corner to generate image data; and
   a server device that transmits and receives traveling information to and from the autonomous mobile device and acquires the image data from the facility camera, wherein:
   when the autonomous mobile device turns at the corner, the server device calculates a magnitude of a corner radius of turning in a traveling path of the autonomous mobile device based on an obstacle captured in image data of the camera that captures the image of the exit of the corner; and
   the autonomous mobile device turns at the corner with the calculated corner radius,
   wherein the corner is configured by a first aisle extending in one direction and a second aisle extending in another direction intersecting the one direction;
   wherein when the server device is not able to acquire the image data, the server device calculates the corner radius that provides the traveling path along outer edges of the first aisle and the second aisle on an outer side at the corner; and
   wherein the server device causes the autonomous mobile device to travel in the traveling path along the outer edges.

9. The autonomous mobile system according to claim 8, wherein the server device calculates the magnitude of the corner radius in accordance with a ratio of the obstacle occupying a space in the image data.

10. The autonomous mobile system according to claim 8, wherein the server device calculates the magnitude of the corner radius in accordance with a type of the obstacle in the image data.

11. The autonomous mobile system according to claim 8, wherein the server device calculates the corner radius that provides the traveling path along the outer edges of the first aisle and the second aisle on the outer side at the corner, depending on a type of the obstacle in the image data.

12. The autonomous mobile system according to claim 11, wherein the autonomous mobile device stands by near a connection point between the outer edge of the first aisle on the outer side and the outer edge of the second aisle on the outer side.

13. The autonomous mobile system according to claim 8, wherein the autonomous mobile device stands by near a connection point between the outer edge of the first aisle on the outer side and the outer edge of the second aisle on the outer side.

14. The autonomous mobile system according to claim 8, wherein:
   the server device calculates a moving speed of the autonomous mobile device based on the obstacle captured in the image data; and
   the autonomous mobile device turns at the corner at the calculated moving speed.

15. An autonomous mobile method for an autonomous mobile device that autonomously moves in a facility provided with a corner in an aisle includes:
   a step of calculating, when the autonomous mobile device turns at the corner, a magnitude of a corner radius of turning in a traveling path of the autonomous mobile device based on an obstacle captured in image data of a camera that captures an image of an exit of the corner; and
   a step of causing the autonomous mobile device to turn at the corner with the calculated corner radius,
   wherein the corner is configured by a first aisle extending in one direction and a second aisle extending in another direction intersecting the one direction, and
   wherein when the image data is not able to be acquired, the corner radius is calculated to provide the traveling path along outer edges of the first aisle and the second aisle on an outer side at the corner, and the autonomous mobile device is caused to travel in the traveling path along the outer edges.

16. A non-transitory storage medium that stores an autonomous mobile program for an autonomous mobile device that autonomously moves in a facility provided with a corner in an aisle, the autonomous mobile program causing a computer to:

calculate, when the autonomous mobile device turns at the corner, a magnitude of a corner radius of turning in a traveling path of the autonomous mobile device based on an obstacle captured in image data of a camera that captures an image of an exit of the corner; and cause the autonomous mobile device to turn at the corner with the calculated corner radius, wherein the corner is configured by a first aisle extending in one direction and a second aisle extending in another direction intersecting the one direction;

wherein when the image data is not able to be acquired, the corner radius is calculated to provide the traveling path along outer edges of the first aisle and the second aisle on an outer side at the corner; and wherein the autonomous mobile device is caused to travel in the traveling path along the outer edges.

* * * * *